United States Patent [19]

Isayev

[11] Patent Number: 5,258,413

[45] Date of Patent: Nov. 2, 1993

[54] CONTINUOUS ULTRASONIC DEVULCANIZATION OF VALCANIZED ELASTOMERS

[75] Inventor: Avraam Isayev, Akron, Ohio

[73] Assignee: The University of Akron, Akron, Ohio

[21] Appl. No.: 902,074

[22] Filed: Jun. 22, 1992

[51] Int. Cl.⁵ ........................... C08F 2/46; C08F 47/24
[52] U.S. Cl. ................................. 521/45.5; 521/40; 521/40.5; 521/41; 521/41.5; 521/44.5
[58] Field of Search ................. 521/40, 40.5, 41, 41.5, 521/44.5, 45.5

[56] References Cited

U.S. PATENT DOCUMENTS 3,725,314  4/1973  Pelofsky ........................... 521/44.5

FOREIGN PATENT DOCUMENTS 62-121741  6/1987  Japan .

Primary Examiner—Paul R. Michl
Assistant Examiner—Olga Asinovsky
Attorney, Agent, or Firm—Oldham, Oldham & Wilson Co.

[57] ABSTRACT

This invention relates to a continuous ultrasonic method for breaking the carbon-sulfur (C—S), sulfur-sulfur (S—S), and if desired, carbon-carbon (C—C) bonds in a vulcanized elastomer. It is well known that vulcanized elastomers having a three-dimensional chemical network, cannot flow under the effect of heat and/or pressure. This creates a huge problem in the recycling of used tires and other elastomeric products. Through the application of certain levels of ultrasonic amplitudes in the presence of pressure and optionally heat, the three-dimensional network of vulcanized elastomer can be broken down. As a most desirable consequence, ultrasonically treated cured rubber becomes soft, thereby enabling this material to be reprocessed and shaped in a manner similar to that employed with uncured elastomers.

23 Claims, 5 Drawing Sheets

CONTINUOUS ULTRASONIC DEVULCANIZATION OF VALCANIZED ELASTOMERS

TECHNICAL FIELD

This invention relates to an improved apparatus and method for continuous recycling of vulcanized elastomers and thermosets. More particularly, this invention relates to a continuous ultrasonic method for breaking the carbon-sulfur (C—S), sulfur-sulfur (S—S), and if desired, carbon-carbon (C—C) bonds in a vulcanized elastomer.

BACKGROUND OF THE INVENTION

It is currently estimated that about 200,000,000 used tires are produced annually. After the useful lifetime of these tires has expired, they are commonly dumped in waste disposal sites, but frequently are discarded on vacant land and in lakes and rivers because the used tires have no value and, in fact, cost money to dispose of properly.

In years past, it was possible for waste disposal sites and reclaiming plants to burn the tires and recover the metal or to dump them at a landfill. However, with increasing public awareness of ecology and the state of the environment, both the State Environmental Protection Agencies and the U.S. Government Environmental Protection Agency, have sought to eliminate this form of air and land pollution.

The most common traditional method for handling waste materials has been to simply dump the waste on designated land areas thereby creating large and often hazardous dumps in which fires are frequent and runoff into water sources is routine. Not only are these dumps eyesores, they are environmental hazards to both the ai and water. It is of no little consequence that while dumps or landfills have often been the cheapest short term way of handling waste material, the land which can be used for this purpose is rapidly running out. This is particularly true in the highly urbanized areas of the industrialized countries. This traditional method of disposing of waste does not allow for the recovery of materials.

A particular problem is found in the disposal of rubber based products, such as automotive tires, hoses and belts, all of which are comprised of natural or synthetic rubber reinforced with other materials such as metal belts and fibrous cords. These products have very little use after they have performed their original and/or primary task and therefore have generally discarded. it is acknowledged that a certain number of tires are used to build retaining walls, guards protecting boating and similar things where resistance to weathering is desirable. However, a far greater number of tires, belts and hoses are simply discarded to become eyesores and breeding grounds for insects and other pests. Burying is particularly ineffective since these materials resist decomposition and tend to work their way to the surface.

There have been many proposals for handling waste materials so as to recover the component products. Some of these included burning off the unwanted material to get at the fire resistant residues or metal substructure. While this may seem to be an answer, it ignores the fact that much useful material would be consumed in burning, that the incineration process itself would not be energy efficient and could release hazardous by-products into the atmosphere. It also ignores the problem of what to do with the ashes.

Other approaches to material recovery have included rendering the waste material into smaller pieces and then forcibly removing the desirable components. This may be a very difficult task when one considers recovery of material from something such as a tire, which is produced to withstand much abuse without loss of function. Even rendering a tire into smaller pieces would still not enhance the recovery of the metal, fiber and rubber products thereof. Besides a great amount of energy would be consumed in rendering the tire into the smaller pieces.

Still other approaches have involved the use of chemicals to break down the materials into their components. However, these methods create chemical sludges and residues which are not only a nuisance, if not impossible to dispose of, but some chemical treatments are dangerous to both human life and the environment.

Still additional approaches have involved the extensive use of cryogenics to lower the temperature of the product to below the glass-transition temperature of the components thereof. The product at this lowered temperature is then crushed sufficiently to cause the components to release sufficiently to effect separation. However, this in an energy intensive process.

The application of ultrasonic waves to the process of devulcanizing rubber is a most recent field. In fact, traditional thinking in the field has indicated that rubber is vulcanized by ultrasonics rather than devulcanized. Okada and Hirano published in *Meiji Gomu Kasei*, 9(1), 14-21 (1987) that the ultrasonic vulcanization of rubber was achieved, and that process demonstrated in the laboratory. Additionally, the use of ultrasound to activate rubber-based adhesives was discussed in *Kauch, Rezina*, (5), 31-2 (1983) where the bonding of rubber strips was described. The dynamic strength of the bonded rubber strips was found to increase with increasing ultrasonic activation time.

Again, the ultrasonic welding of composite polymers was discussed in *Svar. Proizvod.*, (7), 42-3 (1982) where the ultrasonic welding of carbon black-filled rubber was determined to proceed via crosslinking between rubber and the carbon black molecules.

The vulcanization of rubber and crosslinking of polymers by ultrasound is elaborated in DE 2,216,594 published Oct. 26, 1972, based on Japanese priority document JP 71-20736 dated Apr. 6, 1971 wherein ethylene-propylene rubber or polybutadiene rubber-natural rubber mixtures; or polymers, e.g. polyethylene containing vulcanization agents or crosslinking agents were vulcanized or crosslinked, respectively, by ultrasonic waves (500 kHz) in a bath containing cold water or silicone oil.

The application of continuous ultra-high frequency vulcanization to high polarity rubbers, such as chloroprene rubber or butadiene-nitrile rubber is described, *Rubber World*, 162(2), 59-63 (1970).

The only application of ultrasonic waves in a devulcanization mode is described in JP 62121741 (1987). A batch process was described wherein vulcanized rubber was reclaimed by devulcanization by 10 kHz to 1 MHz ultrasonic wave irradiation. The batch process required 20 minutes using 50 kHz ultrasonic wave at 500 watts. The process was found to break carbon-sulfur bonds and sulfur-sulfur bonds, but not carbon-carbon bonds.

DISCLOSURE OF THE INVENTION

This invention relates to a continuous ultrasonic method for breaking the carbon-sulfur (C—S), sulfur-sulfur (S—S), and if desired, carbon-carbon (C—C) bonds in a vulcanized elastomer. It is well known that vulcanized elastomers having a three-dimensional chemical network, cannot flow under the effect of heat and/or pressure. This creates a huge problem in the recycling of used tires and other elastomeric products. It was unexpectedly found that through the application of certain levels of ultrasonic amplitudes in the presence of pressure and optionally heat, the three-dimensional network of vulcanized elastomer can be broken down rather quickly. As a most desirable consequence, ultrasonically treated cured rubber, in the presence of pressure and optionally heat, becomes soft, thereby enabling this material to be reprocessed and shaped in a manner similar to that employed with uncured elastomers.

It is a first object of this invention to detail a continuous process for the devulcanization of vulcanized elastomers.

It is a second object of this invention to detail a continuous process for the devulcanization of vulcanized elastomer particles in which the carbon-sulfur (C—S), sulfur-sulfur (S—S), and if desired, carbon-carbon (C—C) bonds in vulcanized elastomers are broken.

It is a third object of this invention to detail a continuous process for the devulcanization of vulcanized elastomers which uses ultrasound.

It is a fourth object of this invention to detail a continuous process for the devulcanization of vulcanized elastomers which uses ultrasound to devulcanize rubbers in the order of seconds or less.

It is a fifth object of this invention to detail an apparatus effective for the continuous devulcanization of vulcanized elastomers through a die exit bore populated with an ultrasonic horn.

It is a sixth object of this invention to detail an apparatus effective for the devulcanization of vulcanized elastomers through a plurality of die exit bores, each populated with an ultrasonic horn.

It is a seventh object of this invention to provide a continuous process which is capable of breaking a three-dimensional network of highly crosslinked polymers by the application of ultrasonic waves, pressure and optionally heat, to the crosslinked polymer.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED COMPONENT PART LIST

Figure 1:
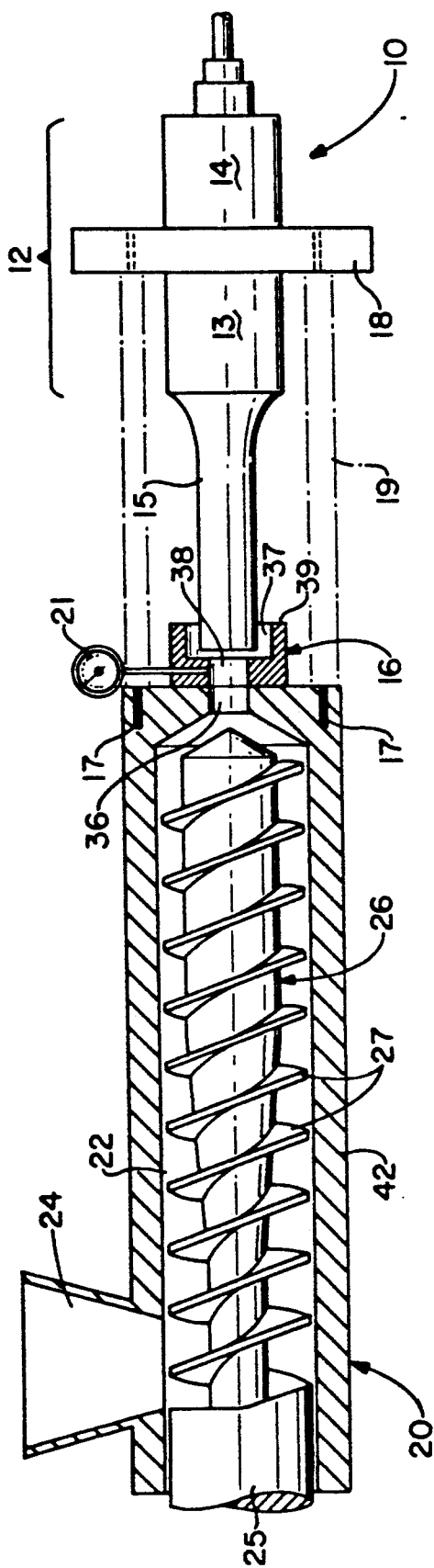
FIG. 1 is an elevational view, in cross-section of the ultrasonic reactor along its longitudinal axis.

| Part Number | Description |
|---|---|
| 10 | ultrasonic generator |
| 12 | transducer |
| 13 | booster |
| 14 | converter |
| 15 | horn |
| 16 | die |
| 17 | mounting holes |
| 18 | mounting bracket |
| 19 | adapter legs |
| 20 | reactor |
| 21 | pressure gauge |
| 22 | barrel |
| 24 | hopper |
| 25 | drive |
| 26 | reactor screw |
| 27 | spiral ridges on shaft |
| 28 | motor (not shown) |
| 39 | termination point of die |
| 42 | heating jacket |
| 44 | longitudinal die/horn combination |
| 46 | radial die/horn combination |
| 48 | oblique die/horn combination |
| c | clearance between the exit point of the die inlet bore and the tip of the horn |
| $d_e$ | die exit bore diameter |
| $d_h$ | horn cross-section diameter |
| $d_i$ | die inlet bore diameter |
| $d_r$ | reactor exit bore diameter |
| $l_b$ | die exit bore depth |
| $l_p$ | depth of insertion of ultrasonic horn section measured from the termination point of the dye |

DETAILED DISCLOSURE OF THE INVENTION

Referring now to the drawings wherein the showings are for purposes of illustrating the preferred embodiment of the invention only and not for purpose of limiting the same, the Figures show the effective application of ultrasound to the continuous devulcanization of rubbers.

It is well known that vulcanized elastomers having a three-dimensional chemical network, cannot flow under the effect of heat and/or pressure. It is precisely for this reason that to date, no literature has described the utilization of an extruder in order to further process a vulcanized rubber. This physical property has prohibited the application of extruder technology to the huge problem of recycling used tires and other vulcanized elastomeric products.

However, it has been discovered that through the application of certain levels of ultrasonic amplitudes in the presence of pressure, and optionally heat, the three-dimensional network of vulcanized elastomer can be broken down. As a most desirable consequence, ultrasonically treated cured rubber becomes soft, thereby enabling this material to be reprocessed and shaped in a manner similar to that employed with uncured elastomers.

FIG. 1 is a semi-schematic representation of a reactor (e.g. an extruder) or any device which can transport vulcanized rubber while simultaneously exerting pressure on it, generally 20, connected to an ultrasonic die assembly, generally 10, of the invention. As shown, the die assembly 10 consists of a transducer portion 12, which includes a power converter 14 and booster 13, connected to a horn portion 15, the assembly being supported by mounting bracket 18, and being attached to the reactor 20 through an adaptor portion 19. The reactor 20 includes a barrel 22, fed through hopper 24, the screw 26 within the barrel portion being driven by a drive 25, energized by a motor 28 (not shown). The horn portion 15 includes a die portion 16 through which the devulcanized elastomer being extruded is forced at a pressure shown by a pressure gauge 21.

Additionally shown in FIG. 1 is ultrasonic generator 10 of the ultrasonic die of the invention, movably attached by mounting bracket 18 through adaptor leg 19 to a reactor 20. As more clearly shown in FIG. 2, the horn portion 15 of the ultrasonic die is shown penetrating to a depth $l_p$ into the die 16 of exit bore depth $l_b$. The distance between $l_p$ and $l_b$ is critical for the effective operation of the devulcanization process and the difference between the value of $l_p$, the horn penetration depth, subtracted from $l_b$, the exit bore depth defines a clearance c through which rubber particles are extruded. If this clearance ($l_b - l_p$) is larger than the rubber particle size, some particles of vulcanized rubber will escape without being devulcanized. On the other hand, if the clearance is too small, the pressure generated in the reactor exit bore may increase and lead to an inability to initiate the ultrasonic generator. There exists some optimal clearance which is dependent upon the size of the rubber particles and/or the thickness of the rubber shreds, and the ultrasonic amplitude, within which optimal conditions of devulcanization can be achieved. In particular, optimal conditions of devulcanization can be achieved when the clearance is between 0.2–0.8 mm, but lower and larger clearances are envisioned.

Additionally, the horn cross-section diameter $d_h$ vis-a-vis the die inlet bore diameter $d_i$ is critical. If the horn cross-section diameter $d_h$ is less than the die inlet bore diameter $d_i$, then particles of vulcanized elastomer are allowed to pass through die exit bore diameter $d_e$ without any significant devulcanization. In a preferred mode, the relationship will be that the diameter of reactor exit bore $d_r$ will closely approximate the die inlet bore diameter $d_i$. Additionally, the ultrasonic horn diameter $d_h$ will be greater than die inlet bore $d_i$, but yet be less than die exit bore $d_e$.

The energy imparted by the ultrasonic waves in the presence of pressure and optionally heat, imposed on the vulcanized rubber are believed responsible for the fast devulcanization. Thus both wave frequency, as well as amplitude are important processing parameters.

Figure 3:
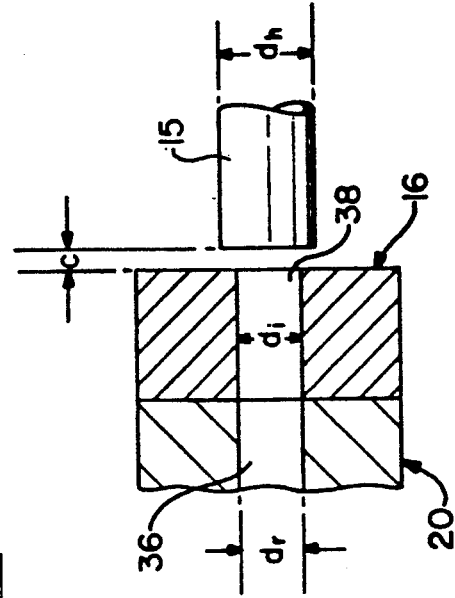
FIG. 3 is an exploded cross-sectional plan view of the die of an ultrasonic reactor along its longitudinal axis, the die in this embodiment having only a first die inlet bore.

While a die possessing two distinctly different bore diameters $d_e$ and $d_i$, has been described so far, the invention is not limited to such. Since the key parameter is the relationship between the horn diameter $d_h$ and the die inlet bore $d_i$, there is no need to have a second exit bore diameter $d_e$. FIG. 3 illustrates this embodiment of the invention.

Figure 4:
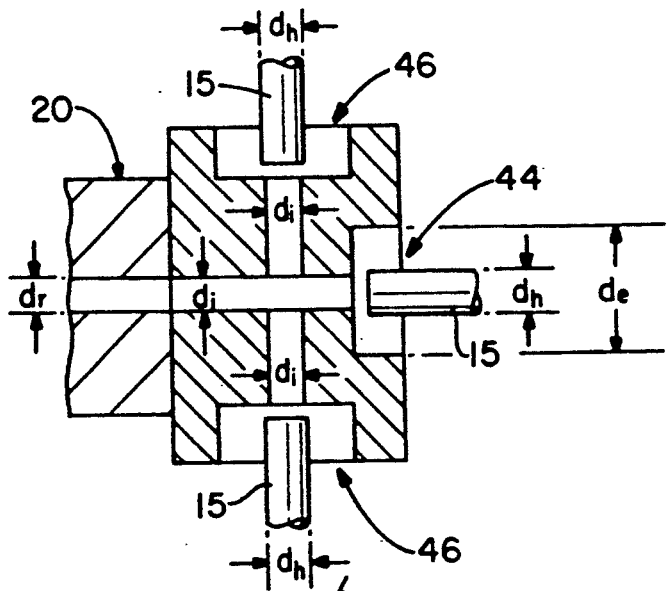
FIG. 4 is an exploded cross-sectional view of an alternative configuration of the die of an ultrasonic reactor along its longitudinal axis showing a longitudinal die/horn combination and a radial die/horn combination, each die having a first die inlet bore and a second die exit bore.
Figure 5:
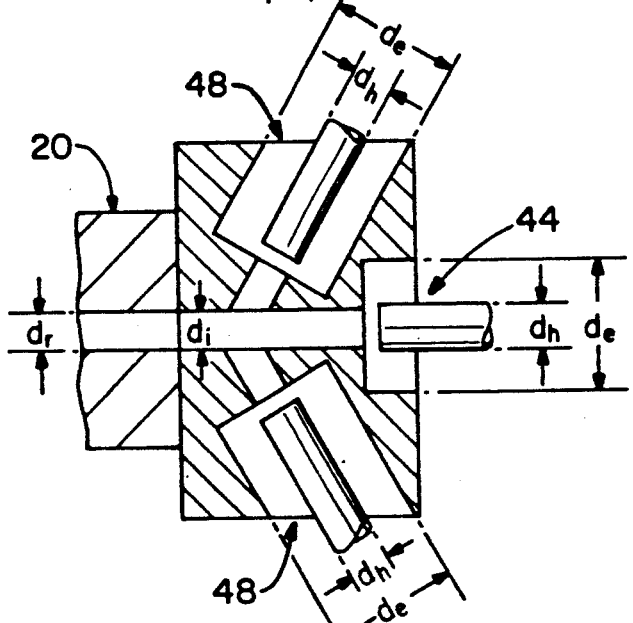
FIG. 5 is an exploded cross-sectional view of an alternative configuration of the die of an ultrasonic reactor along its longitudinal axis showing a longitudinal die/horn combination and an oblique die/horn combination, each die having a first die inlet bore and a second die exit bore.
Figure 6:
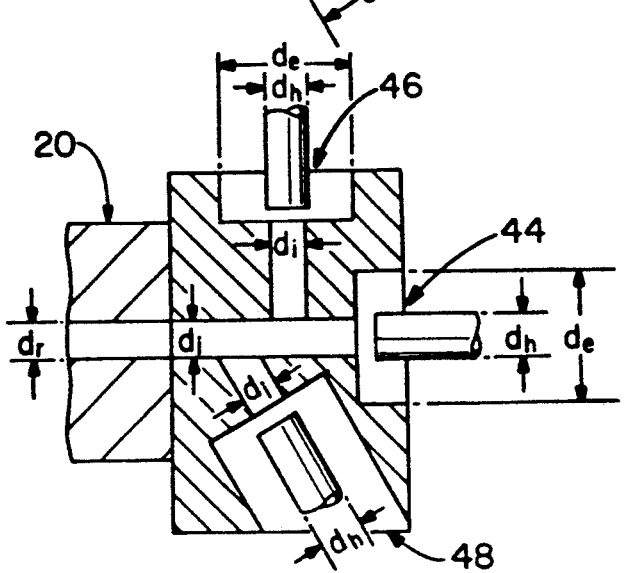
FIG. 6 is an exploded cross-sectional view of an alternative configuration of the die of an ultrasonic reactor along its longitudinal axis showing a longitudinal die/horn combination, a radial die/horn combination and an oblique die/horn combination, each die having a first die inlet bore and a second die exit bore.
Figure 7:
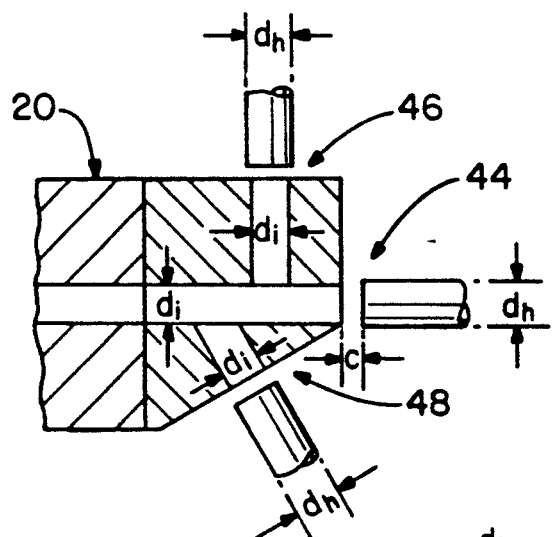
FIG. 7 is an exploded cross-sectional view of an alternative configuration of the die of an ultrasonic reactor along its longitudinal axis showing a longitudinal die/horn combination, a radial die/horn combination, and an oblique die/horn combination, each die only having a first die inlet bore.

While an ultrasonic reactor has been generally described so far containing mainly a single die with a single horn inserted therein, there is no reason to limit the invention to such. As shown in FIGS. 4–7, multiple combinations of die configurations, in so far as to both the positioning and the number of die/horn combinations are envisioned. The key parameter is that all of the horn/die combinations be co-axial to the longitudinal plane of the zone of devulcanization. With respect to the additional die/horn combinations which are positioned around a reactor exit bore, there is no limit on the upper number of these combinations other than that which is a natural ramification of available space considerations. As seen in FIG. 4, the reactor can be equipped with longitudinal die/horn combinations 44 and radial die/horn combinations 46. FIG. 5 illustrates the ability to incorporate longitudinal die/horn combinations 44 with oblique die/horn combinations 48. And FIG. 6 shows a die configuration wherein a longitudinal die/horn combinations 44 is positioned in concert with a radial die/horn combination 46 and an oblique die/horn combination 48. FIG. 7 illustrates the ability to perform the invention with a die possessing only a die inlet bore $d_i$.

Figure 2:
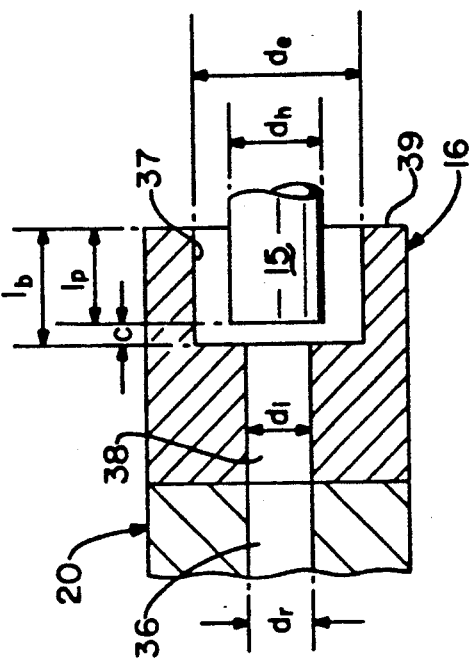
FIG. 2 is an exploded cross-sectional plan view of the die of an ultrasonic reactor along its longitudinal axis, the die in this embodiment having a first die inlet bore and a second die exit bore.

In a similar manner to the relationship between the dies shown in FIGS. 2 and 3, when multiple dies are utilized, such as in FIGS. 4–7, there is also no necessity for the dies to have dies possessing two different bore diameters. As with the single die configuration, since the key parameter is the relationship between the horn diameter $d_h$ and the die inlet bore $d_i$, there is no need to have a second exit bore diameter $d_e$. FIG. 7 illustrates this embodiment of the invention.

Figure 8:
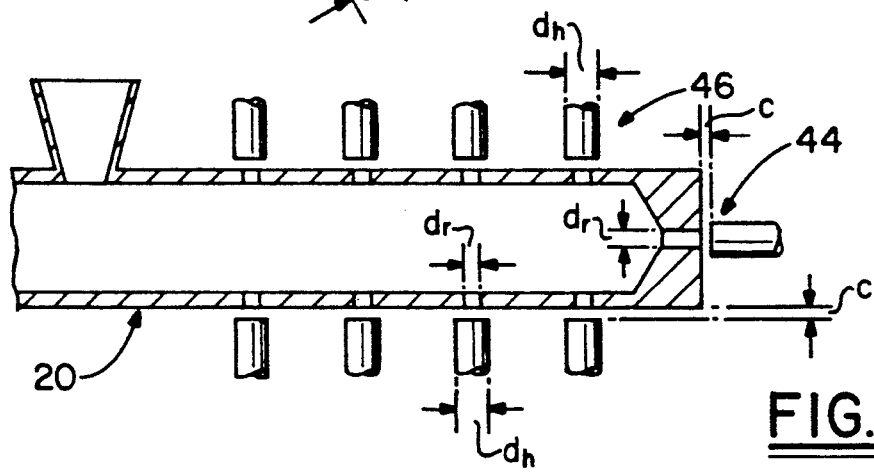
FIG. 8 is a cross-sectional view of an alternative embodiment of the ultrasonic reactor along its longitudinal axis showing a plurality of radial die/horn combinations about the circumference of the reactor with a longitudinal die/horn combination, the reactor not being fitted with any die.

In another embodiment of the invention, and since the diameter of the reactor exit bore $d_r$ closely matches the die inlet bore diameter $d_i$, in some instances, for reactors which have been specifically designed for this purpose, there is no need for a die attached to an exit bore. This arrangement is shown in FIG. 8. In this arrangement, a plurality of radial die/horn combinations 46 are situated at the periphery of the circumference of the longitudinal axis of reactor 20. As with the previous arrangements, the clearance between the periphery of the reactor exit bore and the tip of the ultrasonic horn is positioned at a distance which is maximized by experiment. Typically this clearance is between 0.2 mm–0.8 mm, although both larger and smaller clearances are envisioned under appropriate conditions. Unlike previous embodiments described, there is no absolute need to position a die/horn combination at the reactor exit bore, and in this embodiment, the longitudinal die/horn combination is optional.

Considerable latitude is permissible in selecting the wave frequency and amplitude, and as suggested in the preceding, optimum conditions for a particular polymer are best determined by experimental trials conducted on the rubber of interest. Within such considerations, however, it has been found that the frequency of the waves should be in the ultrasonic region, i.e., at least 15 kilohertz, and a range of from about 15 kHz to 50 kHz is preferable. The amplitude of the wave can be varied up to an amplitude of at least about 10 microns to about 200 microns, again, the exact amplitude and frequency best suited for a particular application being readily determined by experimentation.

The exact location of the point of attachment of the mounting bracket 18 and the length of adaptor legs 19 in relation to the horn 15 is important. It has been determined that depth to which the tip of the horn 15 is inserted into the die exit bore $d_e$ is determined by the devulcanization characteristics of the compound, and particularly on its ability to dissipate ultrasonic energy. In a preferred embodiment, the distance separating the tip of the ultrasonic horn 15 and the terminal point of the die inlet bore $d_i$ is about 0.2–0.8 mm, but larger and smaller clearances are possible.

The reactor is surrounded by a heating jacket 42 which may depend upon electrical heating elements, or heat transfer media of the type well known in the art. The purpose of the jacket is to lower the pressure within the reactor generated by the vulcanized elastomeric particles which are pushed to the reactor exit bore $d_r$. In an unheated mode, the reactor pressure at the extruder exit bore $d_r$ becomes inordinately high leading to overload of the ultrasonic wave generator.

EXAMPLES

Samples of hydrogenated nitrile rubber (HNBR) containing 50 parts of carbon black, 25 parts clay, and various other additives (e.g. accelerator, antioxidant, and curatives known to those skilled in the art), and fluorocarbon polymer (FCP) containing 30 parts silica and various other additives known to those skilled in the art, were vulcanized by using a compression molding technique. The compositions were compression molded and vulcanized into slabs. Specifically, the following conditions were employed.

HNBR: 350° F. for 5 minutes at 250 PSIG.

FCP: 350° F. for 5 minutes at 250 PSIG, followed by 450° F. for 10 hours in an oven.

The vulcanized slabs were subsequently cut into pieces or strands of nominal size approximately (15 mm×5 mm×3 mm) and pieces placed in the hopper of a one inch single screw extruder for thermoplastics operating at various rotation speeds detailed in the following examples and extruded through a 0.5 mm die clearance under pressure, with an ultrasonic horn of 12.7 mm diameter operating at 20 kHz and various wave amplitudes. While the following examples used primarily pieces of vulcanized rubber, the use of longer or shorter strands and/or particles is envisioned.

After passing the vulcanized elastomers through the heated extruder operating at 200° C. and 175° C. for HNBR and FCP, respectively, the devulcanized elastomers were collected and analyzed. In order to perform the analysis, a sample was prepared from the collected material by compression molding at room temperature for 10 minutes at approximately 250 psig. The viscosity characteristics of the devulcanized compounds were measured.

The viscosity vs. shear rate measurements were made at 71° C. using a modified multi-speed Mooney rheometer (Monsanto).

EXAMPLE 1

A series of devulcanization runs were performed on hydrogenated nitrile rubber compound. Pieces of this material were fed into the extruder operating at a barrel temperature of 200° C. and a die clearance of 0.5 mm and an ultrasonic wave amplitude of 96 μm at 20 kHz. The extruder screw was operated at speeds of (1) 5 rpm; (2) 15 rpm; and (3) 25 rpm. Pressure generated by the extruder were 600, 1,200, and 1,800 psi respectively. For comparative purposes, an uncured hydrogenated nitrile rubber compound (4) was tested. The results are graphed in FIG. 9 as a series of plots on a graph of the log of the viscosity ($\eta$) vs. the log of the shear rate ($\gamma$).

Figure 9:
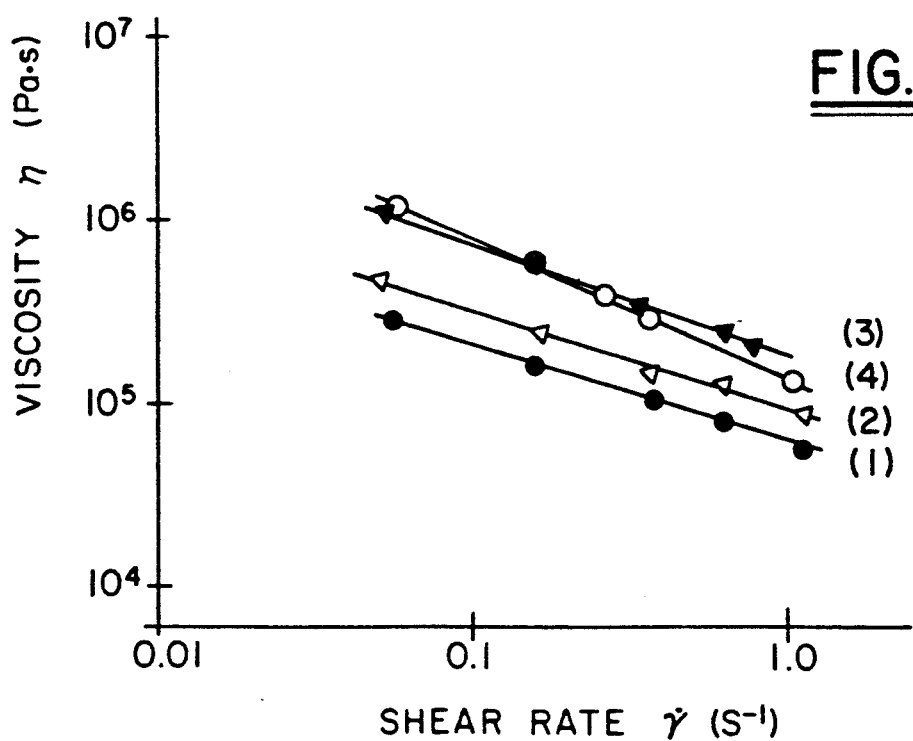
FIG. 9 is a graph of viscosity vs. shear rate for vulcanized hydrogenated nitrile rubber pushed through the extruder and devulcanized at various speeds and pressures at a barrel temperature of 200° C. and a clearance ($c = l_b - l_p$) of 0.5 mm as measured at 71° C. and an ultrasonic wave amplitude of 96 μm: (1) 5 rpm (600 psi); (2) 15 rpm (1,200 psi); (3) 25 rpm (1,800 psi); and (4) uncured (unvulcanized) hydrogenated nitrile rubber.

As is seen in FIG. 9, reference compound (4) illustrates a base comparative case of the original unvulcanized material. Evident in viewing the curves for compounds (1), (2), and (3), the application of ultrasonic waves of amplitude 96 μm has totally devulcanized the materials. Additionally seen from the figure is the fact that the lower the screw rotation speed, the greater the degree of carbon-carbon bond breaking. This is shown in the lowered position of the curves in relation to the base comparative case (4). The application of ultrasonics has not only devulcanized the material, but also lowered the molecular weight of the elastomer, indicating the breaking of carbon-carbon bonds within the polymeric chain.

The lower the rotation speed of the screw, which translates to a longer residence time of the elastomer in the ultrasonic field, the greater the degree of depolymerization.

EXAMPLE 2

Figure 10:
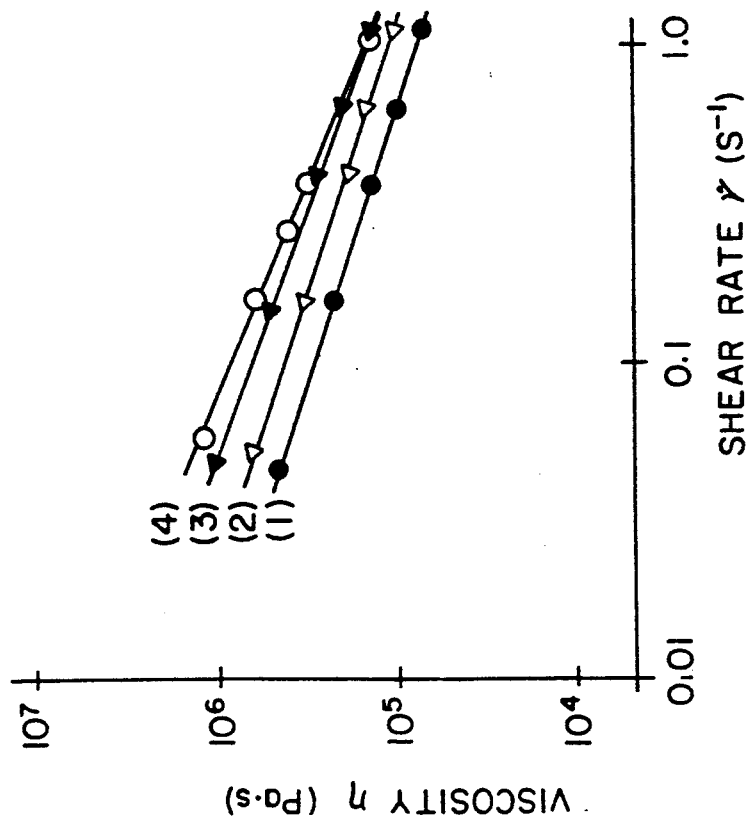
FIG. 10 is a graph of viscosity vs. shear rate for vulcanized hydrogenated nitrile rubber pushed through the extruder and devulcanized at various speeds and pressures at a barrel temperature of 200° C. and a clearance ($c = l_b - l_p$) of 0.05 mm as measured at 71° C. and an ultrasonic wave amplitude of 82 μm: (1) 5 rpm (600 psi); (2) 10 rpm (700 psi); (3) 15 rpm (1,050 psi); and (4) uncured (unvulcanized) hydrogenated nitrile rubber.

To test the effect of the ultrasonic wave amplitude, a series of runs were made at a lowered amplitude of 82 µm for screw speeds of (1) 5 rpm (600 psi); (2) 10 rpm (700 psi); and (3) 15 rpm (1,050 psi). The samples were prepared in a manner analogous to Example 1. As shown in FIG. 10, a similar set of data was obtained indicating the effectiveness of the ultrasonic treatment at a lowered amplitude.

EXAMPLE 3

Figure 11:
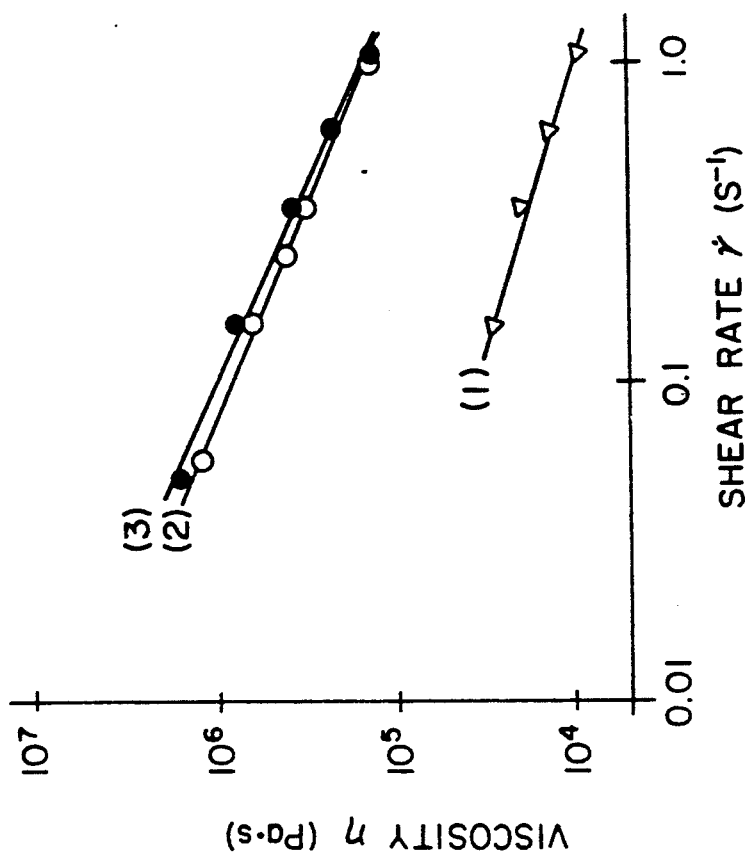
FIG. 11 is a graph of viscosity vs. shear rate for vulcanized hydrogenated nitrile rubber pushed through the extruder and devulcanized at various speeds and pressures at a barrel temperature of 200° C. and a clearance ($c = l_b - l_p$) of 0.5 mm as measured at 71° C. and an ultrasonic wave amplitude of 37 μm: (1) 1 rpm (550 psi); (2) 5 rpm (1,200 psi); and (3) uncured (unvulcanized) hydrogenated nitrile rubber.

The ultrasonic wave amplitude was decreased further to 37 µm in a series of runs plotted in FIG. 11 for screw speeds of (1) 1 rpm (550 psi); and (2) 5 rpm (1,200 psi); and generated in a manner similar to that employed with Example 1. As illustrated in the graph, the data clearly indicates that lower wave amplitudes, coupled with longer residence times cooperatively interact to facilitate not only devulcanization, but to also significantly depolymerize the elastomer as shown at a revolution speed of 1 rpm.

EXAMPLE 4

Figure 12:
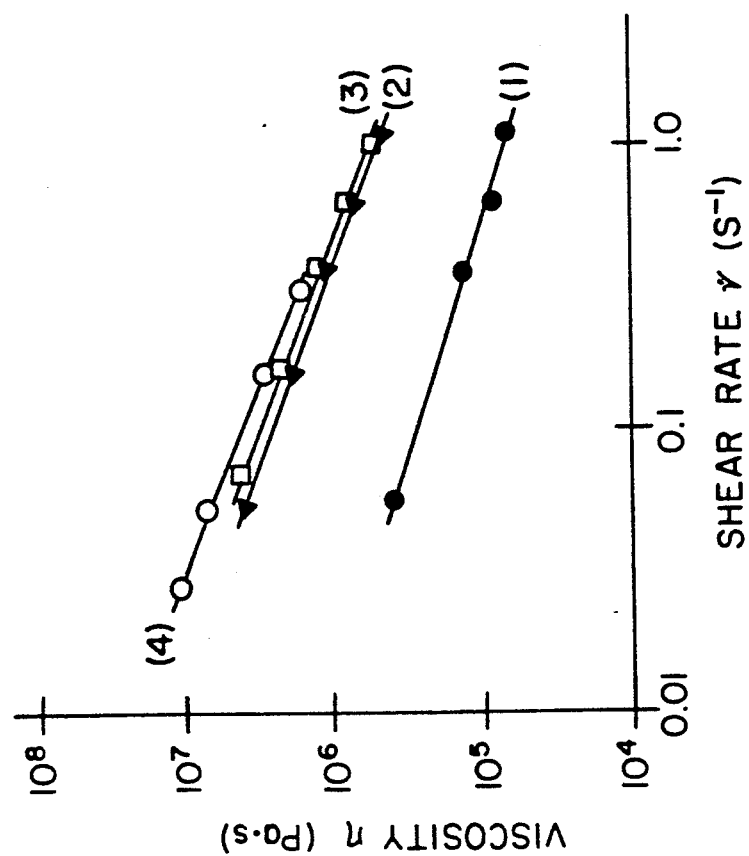
FIG. 12 is a graph of viscosity vs. shear rate for a vulcanized fluoroelastomer pushed through the extruder and devulcanized at various speeds and pressures at a barrel temperature of 175° C. and a clearance ($c = l_b - l_p$) of 0.5 mm as measured at 71° C. and an ultrasonic wave amplitude of 96 μm: (1) 2 rpm (550 psi); (2) 4 rpm (600 psi); (3) 6 rpm (700 psi); and (4) uncured (unvulcanized) fluoroelastomer.

A series of devulcanization runs were performed on fluorocarbon elastomer compound. Pieces of this material were fed into the extruder operating at a barrel temperature of 175° C. and a die clearance of 0.5 mm and an ultrasonic wave amplitude of 96 µm at 20 kHz. The extruder screw was operated at speeds of (1) 2 rpm; (2) 4 rpm; and (3) 6 rpm. Pressures generated by the extruder were 550, 600, and 700 psi respectively. For comparative purposes, an uncured fluorocarbon elastomer compound (4) was tested. The results are graphed in FIG. 12 as a series of plots on a graph of the log of the viscosity ($\eta$) vs. the log of the shear rate ($\gamma$).

As is seen in the Figure, reference compound (4) illustrates a base comparative case when the material is unvulcanized. Evident in viewing the curves for compounds (1), (2), and (3), the application of ultrasonic waves of amplitude 96 µm has once again, totally devulcanized the materials. Additionally seen from the figure is the fact that the lower the screw rotation speed, the greater the degree of carbon-carbon bond breaking. This is shown in the lowered position of the curve observed for a screw speed of 2 rpm in relation to the base comparative case (4). The application of ultrasonics has not only devulcanized the material, but also lowered the molecular weight of the elastomer, indicating the breaking of carbon-carbon bonds within the polymeric chain.

The lower the rotation speed of the screw, which translates to a longer residence time of the elastomer in the ultrasonic field, the greater the degree of depolymerization.

EXAMPLE 5

Figure 13:
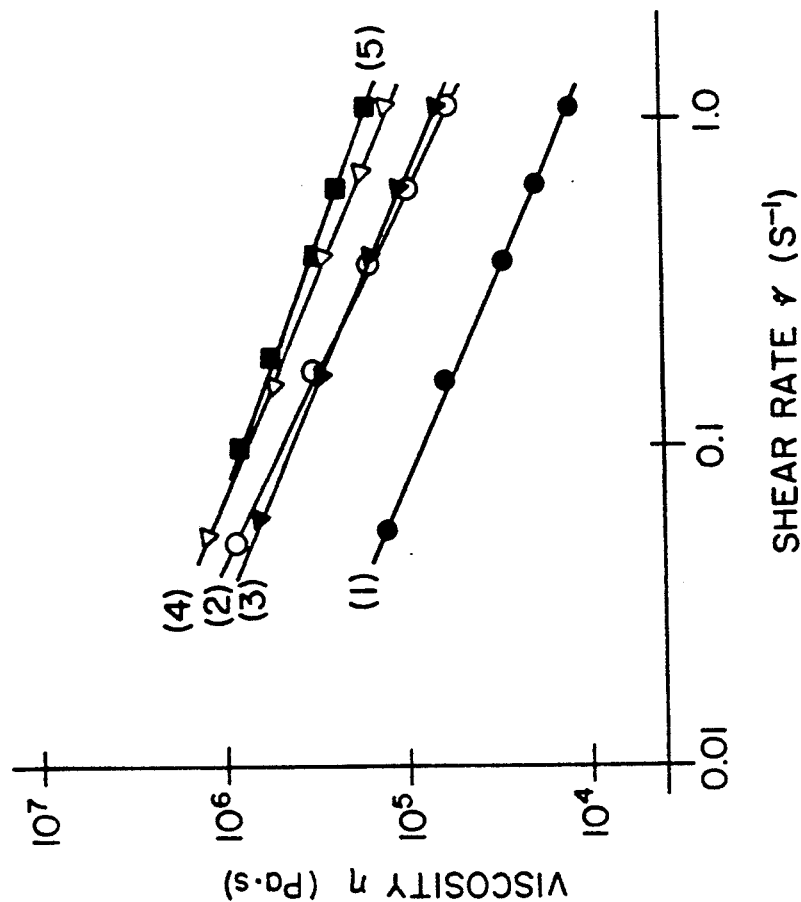
FIG. 13 is a graph of viscosity vs. shear rate for vulcanized SBR/NR-based (styrene butadiene rubber/natural rubber) truck or passenger tire tread peel pushed through the extruder and devulcanized at various speeds, pressures and ultrasonic amplitudes at a barrel temperature of 100° C. and a clearance ($c = l_b - l_p$) of 0.5 mm as measured at 71° C: (1) 2 rpm (350 psi), 96 μm; (2) 2 rpm (500 psi), 82 μm; (3) 5 rpm (400 psi), 96 μm; (4) 5 rpm (600 psi), 82 μm; and (5) 8 rpm (500 psi), 96 μm.

To test the effectiveness of the technique on a passenger car tire tread compound, a sample of vulcanized rubber based on styrene-butadiene rubber/natural rubber compound was obtained from Rondy Inc., Akron, Ohio. The particle size of the material was nominally 0.1-0.05". Pieces of this vulcanized material were fed into the extruder operating at a barrel temperature of 100° C. and a die clearance of 0.5 mm and ultrasonic wave amplitudes of 96 µm and 82 µm at 20 kHz. The extruder screw was operated at various speeds of 2 rpm, 5 rpm, and 8 rpm at various pressures. As is evidenced by the fact that these materials exhibit flow curves at all (FIG. 13), is strong evidenced that devulcanization has occurred since the original vulcanized SBR/NR-based material does not flow at all. Based upon the previous figures, it is anticipated that some amount of carbon-carbon bond breaking has also occurred.

DISCUSSION

As is evident from FIGS. 9-13, the devulcanization of rubbers occurs rapidly, and quantitatively. In all instances, comparisons of the curve generated for unvulcanized material, with that generated from material which had been processed (devulcanized), indicated that the processed material curves never exceeded the unvulcanized standard. The occurrences of the lowered positioning of the curves in the Figures in relation to the unvulcanized standard, is due to the possibility of additionally breaking carbon-carbon bonds in the polymer if desired. The amount of carbon-carbon bond breakage is a controllable parameter and is dependent upon the factors of pressure and most particularly, on the residence time that the material spends in the zone of devulcanization. Devulcanization occurs very fast, typically within 0.1-10 seconds.

The type of rubber which is devulcanized can be of the polar or non-polar type. Without being limited to any enumerated list, some representative types of polar rubbers which are contemplated within the scope of this invention are chloroprene and nitrile rubbers. Again without being limited to any enumerated list, some representative types of non-polar rubbers which are contemplated within the scope of this invention are styrene-butadiene rubbers (SBR); natural rubber, ethylene-propylene rubbers, butadiene rubbers, isoprene rubbers, butyl rubbers, silicone rubbers and fluorocarbon rubbers.

While the initial focus of the discussion has been directed to the continuous devulcanization of rubbers, the invention is not limited to such. It is within the scope of this invention to include the application of ultrasonic waves to the breaking of 3-dimensional cross-linked polymeric networks in thermosets. Without being limited to the enumerated examples, a few representative systems would include polyurethanes, epoxy/phenolic resins, epoxy resins, saturated polyester resins, unsaturated polyester resins, phenolic/formaldehyde resins, etc.

While the figures and ensuing discussion have focused in particular on the application of an extruder to move the original vulcanized material to the extruder exit bore, there is no reason to limit the invention to such. In fact, the only requirements essential for the extruder section of the reactor is that it be capable of moving material under pressure toward the reactor outlet bore and into a receiving die inlet bore. Optionally, the reactor should be capable of being heated. The heating of the reactor tends to decrease the internal pressure generated at the exit bore of the reactor, and reduction of power consumption of the motor.

In its simplest mode of operation, the reactor is fitted at its exit bore with a die having one inlet bore and one exit bore. However, there is no reason to limit the invention to such. It is contemplated and within the scope of the invention to utilize multiple die inlet and exit bores originating off a common die receiving bore. When used in this fashion, it becomes possible to increase the throughput (amount of devulcanized material collected in a unit of time) significantly. One of the simplest methods of accomplishing this is to include additional exit bores positioned radially around the die. However, it is contemplated within the scope of the invention that other positioned dies and horns are possible. The key element is the alignment of the longitudinal axis of the ultrasonic horn with the axis of the exit bore of the reactor and/or inlet bore of the die.

While in describing the term die in this application, the term has been used to denote a separate component of the apparatus, there is no need to specifically limit the concept as such. In fact, it is quite possible that a device could be constructed which incorporates a die into the physical unit itself, without the need for any separate component. However, for ease of cleaning and routine maintenance, it is anticipated that the die would typically be a separate unit attached to the exit bore of the reactor.

It is also possible and within the scope of the invention to omit the die portion attached to the extruder. When in this configuration, the key parameter is that the diameter of the horn be larger than that of the exit bore of the reactor. The die arrangement is typically used for convenience in adapting existing equipment (i.e. extruders) to this application.

While the configuration of the die and/or reactor exit bore has been generally referred to as cylindrical or spherical in shape, there is no reason to limit the invention to such. It is possible to use other geometrically shaped dies and/or reactor exit bore shapes with the invention. Without being limited, it is contemplated that other geometrical shapes, such as rectangular slits, oval slits, etc., can be effectively used in the application. It is also within the scope of the invention that the die and/or reactor exit bore be of constant dimensions, or varying dimensions. The initial dimensions of a rectangular slit, for example may in effect be larger at the inlet side, than they are at the exit side. It is also contemplated within the scope of the invention that irregular shaped exit bores can be accommodated. The critical parameter is that the surface area of the horn be sufficient to be capable of being positioned over the exit bore shape, whether the exit bore is that of the reactor or that of the die.

The effective devulcanization of the rubber requires a careful analysis of the die inlet bore diameter, the die exit bore diameter and the ultrasonic horn diameter. In order to effectively devulcanize the material, it is critical that the horn diameter be larger than the die inlet bore, yet smaller than the die exit bore. This arrangement permits the die to be inserted to a depth into the die exit bore which effectively devulcanizes the material, yet simultaneously does not generate an inordinate amount of pressure within the die of the reactor, thereby causing the horn to stop vibrating.

While in accordance with the patent statutes, a preferred embodiment and best mode has been presented, the scope of the invention is not limited thereto, but rather is measure by the scope of the attached claims.

What is claimed is:

1. A continuous process for the recycling of vulcanized elastomeric particles comprising the steps of:
    (a) feeding vulcanized elastomeric particles into a pressurized zone of devulcanization; and
    (b) ultrasonically treating the elastomers in the zone of devulcanization with an ultrasonic wave propagated co-axially with the zone of devulcanization for a time from about 0.1 seconds to about 10 seconds to effect devulcanization thereby breaking at least a covalent bond selected from the group consisting of a carbon-sulfur bond and a sulfur-sulfur bond.

2. The process of claim 1 wherein a pressure is from about 10 psig to about 10,000 psig.

3. The process of claim 1 wherein the pressure is from about 400 psig to about 1,500 psig.

4. The process of claim 1 wherein the process is heated.

5. The process of claim 4 wherein a temperature is from about 25° C. to about 300° C.

6. The process of claim 1 wherein the elastomers are selected from the group consisting of polar and non-polar rubber compounds.

7. The process of claim 1 wherein an amplitude of the ultrasonic wave is from about 10 microns to about 200 microns.

8. The process of claim 1 wherein a frequency of the ultrasonic wave is from about 15 kHz to about 50 kHz.

9. A continuous process for the recycling of vulcanized elastomers comprising the steps of:
    (a) feeding shredded elastomers into a device having at least one exit bore;
    (b) moving the elastomers in a direction of the exit bore; and
    (c) ultrasonically treating the elastomers as extruded through the exit bore with an ultrasonic wave propagated co-axially with a longitudinal axis of the exit bore, a diameter of the horn being larger than the diameter of the exit bore, the horn additionally being positioned at a clearance distance is about 0.2 mm to 0.8 mm measured along the longitudinal axis of the exit bore for a time from about 0.1 seconds to about 10 seconds to effect devulcanization of the elastomer.

10. The process of claim 9 wherein a pressure is from about 10 psig to about 10,000 psig.

11. The process of claim 9 wherein the pressure is from about 400 psig to about 1,500 psig.

12. The process of claim 9 wherein the process is heated.

13. The process of claim 12 wherein a temperature is from about 25° C. to about 300° C.

14. The process of claim 9 wherein the elastomers are selected from the group consisting of polar and non-polar compounds.

15. The process of claim 9 wherein an amplitude of the ultrasonic wave is from about 10 microns to about 200 microns.

16. The process of claim 9 wherein a frequency of the ultrasonic wave is from about 15 kHz to about 50 kHz.

17. A continuous process for the breaking of a crosslinked thermoset polymer comprising the steps of:
    (a) feeding crosslinked thermoset polymer into a pressurized zone of crosslinked bond breaking; and
    (b) ultrasonically treating the polymer in the zone of crosslinked bond breaking with an ultrasonic wave propagated co-axially with the zone of crosslinked bond breaking for a time from about 0.1 seconds to about 10 seconds to effect the crosslinked bond breaking.

18. The process of claim 17 wherein a pressure is from about 10 psig to about 10,000 psig.

19. The process of claim 18 wherein the pressure is from about 400 psig to about 1,500 psig.

20. The process of claim 17 wherein the process is heated.

21. The process of claim 20 wherein a temperature is from about 25° C. to about 300° C.

22. The process of claim 1 wherein an amplitude of the ultrasonic wave is from about 10 microns to about 200 microns.

23. The process of claim 1 wherein a frequency of the ultrasonic wave is from about 15 kHz to about 50 kHz.

* * * * *

UNITED STATES PATENT AND TRADEMARK OFFICE
CERTIFICATE OF CORRECTION

PATENT NO. : 5,258,413

DATED : November 2, 1993

INVENTOR(S) : Isayev

It is certified that error appears in the above-indentified patent and that said Letters Patent is hereby corrected as shown below:

On the title page, item [54] and column 1, line 3, delete "VALCANIZED" and insert --VULCANIZED--.

Signed and Sealed this

Nineteenth Day of April, 1994

Attest:

BRUCE LEHMAN

Attesting Officer

Commissioner of Patents and Trademarks

UNITED STATES PATENT AND TRADEMARK OFFICE
Certificate

Patent No. 5,258,413                                    Patented: November 2, 1993

On motion pursuant to 37 CFR § 1.634 in Interference No. 103,667, it has been found that the above identified patent, through error and without any deceptive intent, improperly sets forth the inventorship.

Accordingly, pursuant to 35 U.S.C. § 256, it is hereby certified that the correct inventorship of this patent is: Avraam Isayev and Boris Dinzburg.

Signed and Sealed this Eleventh Day of May, 1999.

MICHAEL SOFOCLEOUS
*Administrative Patent Judge*
Board of Patent Appeals and Interferences